3,374,246
PREPARATION OF 2,4,6-HEPTANETRIONE AND 2,6-DIMETHYL-4-PYRANONE

Erich Marcus and John K. Chan, Charleston, W. Va., assignors to Union Carbide Corporation, a corporation of New York
No Drawing. Filed Oct. 23, 1965, Ser. No. 504,161
6 Claims. (Cl. 260—345.9)

The present invention relates to a process for the preparation of 2,4,6-heptanetrione and 2,6-dimethyl-4-pyranone.

The compounds 2,4,6-heptanetrione and 2,6-dimethyl-4-pyranone are known compounds which are useful as chemical intermediates. For example, 2,6-dimethyl-4-pyranone has been used as the starting material in the preparation of 3,5-dichloro-2,6-dimethyl-4-pyridinol which is useful as a parasiticide. In addition to having utility as an intermediate, 2,4,6-heptanetrione is of interest as a chelating agent.

Heretofore 2,6-dimethyl-4-pyranone has been prepared by the decarboxylation of dehydroacetic acid by treatment with hydrochloric acid at about 100° C. To prepare 2,4,6-heptanetrione, the 2-6-dimethyl-4-pyranone compound was further reacted first with water in the presence of barium hydroxide and then with hydrogen chloride. The use of hydrochloric acid at elevated temperatures presented corrosion problems and unwanted by-products. The processing costs for preparing the trione were obviously prohibitive because of the many process steps required.

It is also known to the prior art that acetone can be prepared in yields of 95 percent or more by reacting diketene with at least an equimolar amount of water in the presence of a tertiary amine catalyst.

We have now discovered that 2,4,6-heptanetrione and 2,6-dimethyl-4-pyranone can be prepared by reacting diketene with from about 0.3 to about 0.9 mole of water per mole of diketene in the presence of a tertiary amine as catalyst. The reactions involved are illustrated by the following equations:

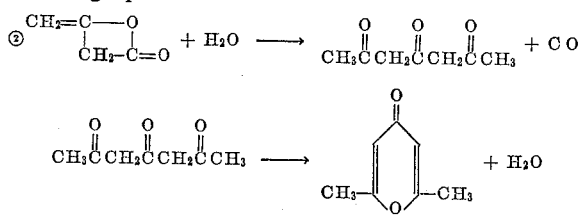

The present invention makes it possible to obtain good yields of 2,4,6-heptanetrione and 2,6-dimethyl-4-pyranone in a single process step from readily available and relatively inexpensive raw materials. This discovery also permits the use of relatively low reaction temperatures and obviates the corrosion problem of the prior art.

The molar ratio of water to diketene can range from about 0.3 to about 0.9. We have found, however, that as the molar ratio decreases from 0.9 to the stoichiometrically required ratio the amount of acetone by-product decreases and, consequently, the yield of the desired products increases. For this reason we prefer to use from about 0.4 to about 0.6 mole of water per mole of diketene.

Any tertiary amine can be used to catalyze the reaction. It is preferred that the catalyst be free of groups which are reactive with diketene and contain less than 18 carbon atoms per tertiary nitrogen atom. Illustrative of the tertiary amines which are useful are trimethylamine, dimethylethylamine, triethylamine, tri-n-butylamine, tri(2-ethylhexyl)amine, N,N,N',N' - tetramethylethylenediamine, N-methylpyrrolidine, N-ethylpiperidine, N,N'-di-n-propylpiperazine, N-sec-butylmorpholine, N-methylhexamethylenimine, N,N-dimethylaniline, pyridine, 2-picoline, 3,5-lutidine, 2,4,5-collidine, quinoline, quinaldine, 4-ethylquinoline, and the like.

The preferred tertiary amine catalysts are the azabicyclooctane compounds such as 1,4-diazabicyclo[2.2.2]octane, 1-azabicyclo[2.2.2]octane, and their alkyl and dialkyl derivatives wherein each alkyl group contains from 1 to about 8 carbon atoms; for example, 2,6-dimethyl-1,4-diazabicyclo[2.2.2]octane, 3,5-diethyl-1-azabicyclo[2.2.2]octane, 2-n-butyl-1,4-diazabicyclo[2.2.2]octane, 3-isopropyl-1-azabicyclo[2.2.2]octane, 2-(2-ethylhexyl)-1,4-diazabicyclo[2.2.2]octane, 3,5 - dioctyl-1-azabicyclo[2.2.2]octane, and the like. The particularly preferred catalysts are 1,4-diazabicyclo[2.2.2]octane and 1-azabicyclo[2.2.2]octane.

The tertiary amine compounds are used in catalytically effective concentrations. The concentration to be used in any given case will depend to some extent upon the activity of the particular tertiary amine used, the selected reaction temperature and the desired rate of reaction. In general, concentrations ranging from about 0.01 to about 5.0 percent by weight or higher, based on the weight of water and diketene, provide satisfactory results. While still higher concentrations will lead to somewhat higher reaction rates, they are not advisable in view of economic considerations. Concentrations of from about 0.25 to about 1.0 percent are preferred.

The reaction is conveniently carried out at temperatures of from about −20° C. to about 80° C., or higher. Preferred reaction temperatures range from about 0° C. to about 60° C. with temperatures of from about 20° C. to 40° C. being particularly desirable. Although temperature control ordinarily presents no difficulty, a greater degree of control can be obtained by conducting the reaction in any inert organic solvent that does not interfere with the reaction. Suitable solvents include acetone, ethyl acetate, heptane, cyclohexane, benzene, and the like.

Atmospheric pressures are suitable for conducting the reaction although somewhat higher or lower pressures can be used without any appreciable effect upon the reaction.

In one embodiment of this invention it is preferable to slowly add the diketene to a solution of the catalyst in water and to then allow the reaction to proceed at the temperature selected. The progress of the reaction can be followed in any convenient manner. It is particularly helpful to note, however, that one mole of carbon dioxide is released for every mole of the desired product that is produced. Thus, the extent to which the reaction has been completed can be conveniently determined by noting the amount of carbon dioxide which is evolved. The reaction mixture is stirred, preferably until the termination of the reaction is signalled by the cessation of carbon dioxide evolution. Although the time required for this event to occur will vary depending upon the reaction conditions and the particular catalyst used, a period of from 8 to 16 hours is generally required when using a reaction temperature between 25° C. and 40° C. An appreciable amount of the desired products is usually formed within 4 hours.

The product mixture will generally contain from 0.6 to 3.0 moles of 2,4,6-heptanetrione per mole of 2,4-dimethyl-4-pyranone. The factors which control this ratio are not wholly understood although it has been observed that increased reaction times favor the production of higher proportions of the 2,6-dimethyl-4-pyranone.

The 2,4,6-heptanetrione and 2,6-dimethyl-4-pyranone are readily recovered from the product mixture by removing low-boiling products under reduced pressure and then separating the trione from the pyranone by conventional means such as by fractional recrystallization from cyclohexane.

3

The following examples serve to illustrate the invention. Unless otherwise indicated, parts refers to parts by weight.

*Example 1*

The reactor was charged with 18.0 parts of water and 0.5 part of 1,4-diazabicyclo[2.2.2]octane. A temperature of from 28° C. to 30° C. was maintained while 168 parts of diketene were slowly added with stirring over a period of 1.5 hours. The temperature was then raised to 30° C. and maintained between 30° C. and 40° C. for several hours until carbon dioxide ceased to evolve.

Low-boiling materials were removed from the product mixture by using a rotary evaporator at 25° C. and 2.5 millimeters of mercury. The product mixture was then filtered to remove a precipitate which was primarily 2,6-dimethyl-4-pyranone. Further cooling of the mother liquor gave a mixture of 2,4,6-heptanetrione and 2,6-dimethyl-4-pyranone which was separated by fractional recrystallization from cyclohexane.

Based upon analysis of the crude product, the yield of 2,4,6-heptanetrione was 59.5 percent and the yield of 2,6-dimethyl-4-pyranone was 18.7 percent representing a combined yield of 78.2 percent.

In like manner 2,4,6-heptanetrione and 2,6-dimethyl-4-pyranone are produced by using 1-azabicyclo[2.2.2]octane or 2-methyl-1,4-diazabicyclo[2.2.2]octane as the catalyst.

*Example 2*

This example was conducted in the same manner as Example 1 except that 0.5 part of triethylamine was used as the catalyst. The combined yield of 2,4,6-heptanetrione and 2,6-dimethyl-4-pyranone was 16 percent of the theoretical.

*Example 3*

This example was conducted in the same manner as Example 1 except that 1.0 part of pyridine was used as the catalyst. The combined yield of 2,4,6-heptanetrione and 2,6-dimethyl-4-pyranone was 41 percent of theoretical.

*Example 4*

This example was conducted in the same manner as Example 1 except that 210 parts of diketene were added, thus providing a molar ratio of water to diketene of 0.4. The combined yield of 2,4,6-heptanetrione and 2,6-dimethyl-4-pyranone was 50 percent of the theoretical.

What is claimed is:

1. A process for the production of 2,4,6-heptanetrione and 2,6-dimethyl-4-pyranone which comprises reacting diketene with from about 0.3 to about 0.9 mole of water per mole of diketene in contact with a catalytically effective concentration of a tertiary amine.
2. A process as claimed in claim 1 which comprises reacting diketene with from about 0.3 to about 0.9 mole of water per mole of diketene in contact with from about 0.01 to about 5.0 percent by weight, based on the total weight of water and diketene, of a tertiary amine containing less than about 18 carbon atoms per tertiary nitrogen atom.
3. A process as claimed in claim 2 in which the molar ratio of water to diketene is from about 0.4 to about 0.6.
4. A process as claimed in claim 2 in which the tertiary amine is selected from the group consisting of 1,4-diazabicyclo[2.2.2]octane, 1-azabicyclo[2.2.2]octane, and the monoalkyl and dialkyl derivatives thereof wherein each alkyl group contains from 1 to 8 carbon atoms.
5. A process as claimed in claim 3 in which the tertiary amine is 1-azabicyclo[2.2.2]octane.
6. A process as claimed in claim 3 in which the tertiary amine is 1,4-diazabicyclo[2.2.2]octane.

References Cited

UNITED STATES PATENTS

Bhauwat et al.: J. Indian Chem. Soc., vol. 23, pp. 269–72 (1946).

Hamamoto et al.: Nippon Kagaku Zasshi, vol. 79, pp. 840–3 (1958).

Wolf et al.: Arch. Biochem., vol. 28, pp. 201–6 (1950).

Miyaki et al.: J. Pharm. Soc., Japan, vol. 75, pp. 43–6 (1955).

JOHN D. RANDOLPH, *Primary Examiner.*

J. M. FORD, *Assistant Examiner.*